United States Patent [19]

Moredock

[11] Patent Number: 5,656,050
[45] Date of Patent: Aug. 12, 1997

[54] AIR PRECLEANER FOR CENTRIFUGALLY EJECTING HEAVIER THAN AIR PARTICULATE DEBRIS FROM AN AIR STREAM

[75] Inventor: James G. Moredock, Jacksonville, Fla.

[73] Assignee: The Sy-Klone Company, Inc., Jacksonville, Fla.

[21] Appl. No.: 426,184

[22] Filed: Apr. 21, 1995

[51] Int. Cl.$^6$ ............................................. B01D 45/00
[52] U.S. Cl. ........................... 55/394; 55/404; 55/407; 55/419; 55/430; 55/438; 55/449
[58] Field of Search ........................ 55/385.3, 391, 55/394, 397, 400, 404, 407, 408, 419, 438, 430, 449, 456, DIG. 28; 95/270

[56] References Cited

U.S. PATENT DOCUMENTS

| 297,028 | 4/1884 | Stainfield | 55/407 |
|---|---|---|---|
| 653,518 | 7/1900 | Martin | 55/404 |
| 710,626 | 10/1902 | Smith | 55/404 |
| 970,397 | 9/1910 | Rush | 55/407 |
| 1,934,311 | 11/1933 | Kegerreis et al. | 55/394 |
| 2,193,479 | 3/1940 | Donaldson . | |
| 2,304,778 | 12/1942 | Cresswell . | |
| 2,417,130 | 3/1947 | Russell . | |
| 2,973,830 | 3/1961 | Gruner . | |
| 3,552,102 | 1/1971 | Araki . | |
| 3,670,480 | 6/1972 | Petersen . | |
| 3,740,932 | 6/1973 | Borshem . | |
| 3,973,937 | 8/1976 | Petersen . | |
| 4,135,897 | 1/1979 | Gondek | 55/404 |
| 4,138,761 | 2/1979 | Nauta . | |
| 4,197,102 | 4/1980 | Decker . | |
| 4,201,557 | 5/1980 | Petersen . | |
| 4,373,940 | 2/1983 | Petersen | 55/328 |
| 4,459,141 | 7/1984 | Burrington et al. | 55/391 |
| 4,547,207 | 10/1985 | Petersen . | |
| 5,022,903 | 6/1991 | Decker . | |
| 5,449,391 | 9/1995 | Decker | 55/404 |

FOREIGN PATENT DOCUMENTS

| 683986 | 6/1930 | France . |
|---|---|---|
| 483058 | 7/1953 | Italy . |

OTHER PUBLICATIONS

Advertisements for Best–Ex Gentry Air Pre–Cleaners, by Vest–Ex, Inc. before 1990.
Photographs of Gentry Air Pre–Cleaner sold by Best–Ex, Inc. in the United States.
Photocopy of cutaway view of the Gentry Air Pre–Cleaner sold by Best–Ex, Inc.
Advertisement, Price List, and Specification for Turko Pre–Cleaner by Sureco, Mar. 1, 1987.

*Primary Examiner*—C. Scott Bushey
*Attorney, Agent, or Firm*—Antonelli, Terry, Stout & Kraus, LLP

[57] ABSTRACT

An air precleaner and method for centrifugally ejecting heavier-than-air particulate debris from an air stream utilizes a circular separator chamber formed with a toroidal dome for smooth airflow transition of the vortex airflow moving through the separator chamber in a cyclonic pattern upwardly from an inlet in a base of the precleaner past a debris ejection duct where it is folded over by the toroidal dome for whirlpooling down to an outlet in the base radially inwardly of and through the upwardly moving vortex airflow. The area for the airflow in the separator chamber progressively decreases linearly to increase the speed of the airflow in the chamber. A particle accelerator assembly includes a plurality of appendages that arc back from a central hub in a swept-back attitude relative to a direction of the vortex airflow. The particle accelerator assembly is rotatably powered at a speed in excess of the speed of the incoming vortex airflow for increasing the speed thereof in interaction of a portion of the appendages with the higher speed outgoing airflow. The air precleaner, which can be used for internal combustion engines, for example, dramatically improves the removal of heavier-than-air particles across a broad spectrum of intake air demand. It maximizes the use of centrifugal force while minimizing airflow restriction, offering a flat performance curve over the entire airflow range.

21 Claims, 10 Drawing Sheets

PERFORMANCE OF THE AIR PRECLEANER OF THE INVENTION

AIR PRECLEANER FOR CENTRIFUGALLY EJECTING HEAVIER THAN AIR PARTICULATE DEBRIS FROM AN AIR STREAM

FIELD OF THE INVENTION

The present invention relates to an improved air precleaner and method for centrifugally ejecting heavier-than-air particulate debris from an air stream which is drawn through the air precleaner for use in an apparatus such as an internal combustion engine, a ventilation system, a cooling fan, or an air compressor.

BACKGROUND AND SUMMARY OF THE INVENTION

Air precleaners that separate heavier-than-air particles from the air used in combustion type engines are known. All of these known air precleaners are functional, but do not address the needs of current combustion engine designs for extremely low initial restriction and high particle separating efficiency over the broad airflow range with which they are used.

The following is a list of U.S. pat. nos. relating to air cleaning devices:

U.S. Pat. Nos. 2,193,479 2,304,778 2,417,130 2,973,830 3,552,102 3,670,480 3,740,932 3,973,937 4,138,761 4,197,102 4,201,557 4,547,207 5,022,903

An object of the present invention is to provide an improved air precleaner and method for centrifugally ejecting heavier-than-air particulate debris from an air stream which overcome the aforementioned disadvantages of the known air precleaners. More particularly, an object of the present invention is to provide an improved air precleaner and method which meet or exceed the requirements for use of the air precleaner in connection with diesel engines, offering significant improvements in debris removal with minimal impact on intake airflow as compared with conventional air precleaners. A further object of the invention is to provide an improved air precleaner which can also be adapted for use on other systems that require ambient air at all environmental and altitudinal applications.

These and other objects of the invention are attained by the air precleaner of the invention, which according to a disclosed preferred embodiment comprises a base; a circular separator chamber connected to the base and including an inner wall with a debris ejection duct therein, and a particle accelerator assembly rotatably mounted in the separator chamber. The base has an inlet for the passage of debris laden air into the air precleaner, a plurality of air inlet vanes angled upwardly with respect to a longitudinal axis of the air precleaner for directing incoming debris laden air into the circular separator chamber as a vortex airflow, and an outlet for the passage of air from the air precleaner after the air has moved through the circular separator chamber for centrifugally removing heavier-than-air particulate debris therefrom by way of the debris ejection duct.

The circular separator chamber of the air precleaner is formed with a toroidal dome in the disclosed embodiment for smooth airflow transition of the vortex airflow moving through the separator chamber in a cyclonic pattern upwardly from the inlet past the debris ejection duct where it is folded over by the toroidal dome for whirlpooling down to the outlet radially inwardly of and through the upwardly moving vortex airflow in the chamber. The inside surface of the separator chamber is configured to minimize resistance to the airflow vortex while directing the airflow vortex to change directions, enter the air outlet passageway in the base, and enter into the intake duct of the associated device such as an internal combustion engine. The air inlet vanes, base and cylindrical toroidal dome separator chamber are also configured to direct the vortex airflow with a minimum of turbulence and airflow restriction.

The toroidal dome of the separator chamber is formed by a circular toroidal arch at an upper end of the separator chamber in the illustrated embodiment. The inner wall of the separator chamber, as seen in a cross section thereof along a longitudinal axis of the air precleaner, slopes inwardly in the direction of the toroidal dome to decrease the cross sectional area of the flow path for the vortex airflow moving through the separator chamber. In the disclosed embodiment, the shape of the separator chamber provides a linear reduction in cross sectional area of this flow path thereby increasing the velocity of the vortex airflow in the chamber and keeping debris in the air circulating around the inner wall of the chamber for ejection through the debris ejection duct.

According to the preferred embodiment, the debris ejection duct extends upwardly along the inner wall of the separator chamber between the air inlet and the toroidal dome. The open area of the debris ejection duct is larger at a lower end thereof and decreases from the lower end to the upper end.

The particle accelerator assembly of the air precleaner includes a central hub and a plurality of curved appendages that arc back from the central hub in a swept-back attitude relative to the direction of the vortex airflow coming off the upwardly angled air inlet vanes. A curved area of the appendages extends downwardly to a passageway of the air outlet of the base. The curved area is cupped in the direction of the airflow vortex in the air outlet passageway for rotationally powering the particle accelerator assembly at a speed greater than the rotational speed of the incoming vortex airflow. This configuration of the appendages produces an outward velocity vector to any air or debris that is impacted by the appendages, thus encouraging ejection from the debris ejection duct.

The particle accelerator assembly further includes a center shaft connected to the central hub. The assembly is rotatably mounted in the separator chamber by way of the center shaft which is rotatably supported by a bearing assembly in an upper end of the separator chamber. The central hub has an outer configuration which forms a smooth transition from a downward arch of the circular toroidal dome of the separator chamber to the bottom of the central hub which ends as a rounded tipped cone centered over the air outlet in the base of the air precleaner. A labyrinth seal is provided between adjacent ends of the central hub of the particle accelerator assembly and the downward arch of the circular toroidal dome of the separator chamber in the vicinity of the smooth transition from the downward arch to the central hub. The labyrinth seal discourages debris migration from the separator chamber to the bearing assembly. This arrangement of the particle accelerator assembly within the separator chamber allows the air precleaner to direct the airflow vortex with a minimum of turbulence and resistance.

The radial outer ends of the appendages of the particle accelerator assembly extend vertically and are contoured to match an inward slope of the circular toroidal dome separator chamber with an equal distance along the entire leading edge of the vertically extending outer ends of the appendages to the debris ejection duct. The vertically extending outer ends of the appendages are wider at their bottom end and narrow in the direction of their top end. Each of the vertically extending outer ends of the appendages have a plurality of outwardly directed strakes formed thereon for entrapping and directing debris into the debris ejection duct. Each of the air inlet passages is also provided with directional strakes on its windward side for directing the airflow as it passes over the air inlet vanes. The appendages also each have strakes formed into the top and bottom of a leading edge thereof for entrapment of air borne debris, directing the debris down the length of the appendage and depositing the debris in the airflow vortex circulating around the inner wall of the circular toroidal dome separator chamber. As noted above, the improved air precleaner of the invention is powered by the air that is pulled through the inlet thereof and operates on fractional horsepower, resulting in minimal air restriction for maximum particle ejection efficiency.

The debris ejection duct in the wall of the separator chamber extends upwardly at a 90° angle along the inward sloping surface, stopping at the top of the circular toroidal dome separator chamber. The ejection duct is in effect an air scoop that extends into the outermost area of the airflow vortex such that it will eject debris and a small quantity of vortex air from the separator chamber. The debris ejection duct is positioned near normal to the airflow vortex, thus presenting several opportunities for debris ejection while the airflow vortex passes over the air scoop multiple times. The debris ejection duct is tapered from the largest opening at the lower end thereof, to the smallest open area at the top of the duct. This encourages the ejection of debris and minimizes loss of air from the airflow vortex.

The inner wall of the separator chamber in the disclosed embodiment is configured with three circumferential strakes. One strake is located at the bottom of the debris ejection duct, one is in the middle, and one is at the top. These strakes are effective to trap debris and direct it into the debris ejection duct while minimizing any effect on the airflow vortex.

A method of the invention for moving air through an air precleaner for centrifugally ejecting heavier-than-air particulate debris from the moving air comprises drawing debris laden air into the air precleaner, directing the air drawn into the air precleaner into a vortex flow within the air precleaner, increasing the velocity of the vortex flow within the air precleaner for centrifugally ejecting heavier-than-air particulate debris therefrom, and smoothly folding over the vortex flow at one end of the air precleaner by interacting the vortex flow with a toroidal dome of the air precleaner for whirlpooling the moving air back through the vortex flow inwardly thereof to an air outlet of the air precleaner. As noted above, the step of increasing the velocity of the vortex flow within the air precleaner includes moving the vortex flow through a passage in the air precleaner whose cross sectional areas linearly decreases. The velocity of the vortex flow in the air cleaner is also increased by interaction of the vortex airflow with the appendages of the particle accelerator assembly which move through the air at speeds greater than the incoming air.

These and other objects, features and advantages of the present invention will become more apparent from the following description of a preferred embodiment in accordance with the invention when taken in connection with the accompanying drawings.

DETAILED DESCRIPTION OF DISCLOSED EMBODIMENT

Figure 1:
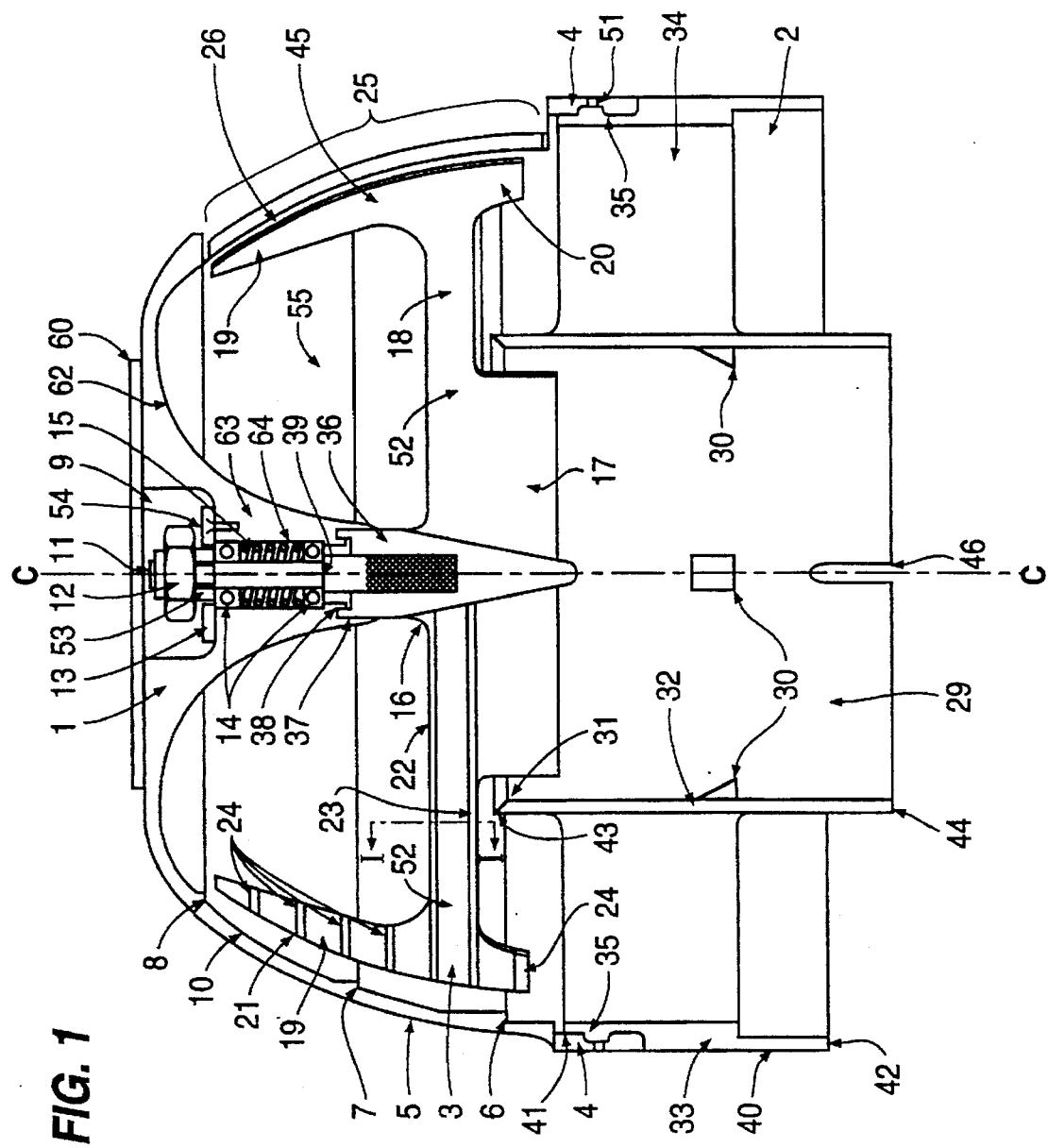
FIG. 1 is a side sectional view of the air precleaner of the present invention.

With the reference to the drawings, FIGS. 1–11 show various views of the air precleaner of the present invention at 1. The air precleaner 1 is comprised of a cylindrical base assembly 33 and has an air inlet passageway 2, an air outlet passageway 29, a circular toroidal dome separator chamber 5 attached to the top of the cylindrical base assembly 33 and having a debris ejection duct 25, and a particle accelerator assembly 16 that is rotatably mounted to the center of the circular toroidal dome separator chamber 5. The air precleaner 1 is a device used for separating debris from the air in all environments and all altitude conditions.

The cylindrical base assembly 33 is formed in a single piece to include an outer circumferential partition 40 connected to an inner circumferential partition 32 by multiple upwards angled air inlet vanes 34, and the inner circumferential partition 32 forms the air outlet passageway 29 having multiple stop tabs 30, slots 46 and leading edge chamber 31. According to the orientation as is shown in the figures, the outer circumferential partition 40 has a top 41 and a bottom 42; the inner circumferential partition 32 has a top 43 and a bottom 44.

At numerous places around the top edge of the outer circumferential partition 40 are the male interlocking connector joints 35 that mate to the numerous female interlocking connector joints 4 to form the interlocking connector joints 51 attached to the bottom edge of the circular toroidal dome separator chamber 5.

Figure 2:
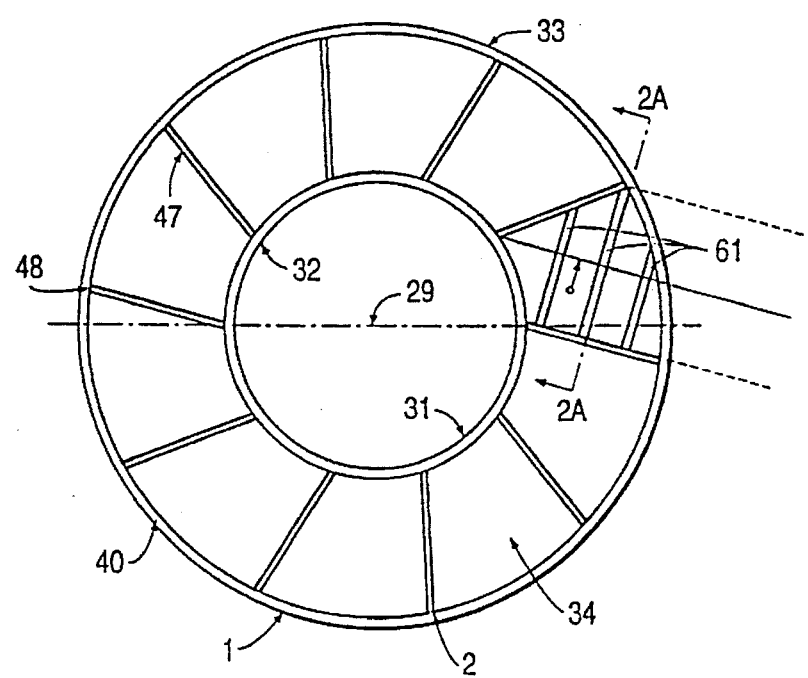
FIG. 2 is a bottom view of the cylindrical base assembly and FIG. 2A is a sectional view of the directional strake of an upwardly angled air inlet vane of the present invention taken along the line II—II in FIG. 2.
Figure 2A:
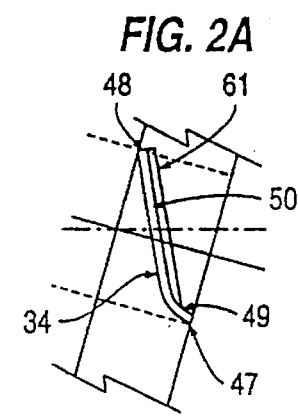
Figure 3:
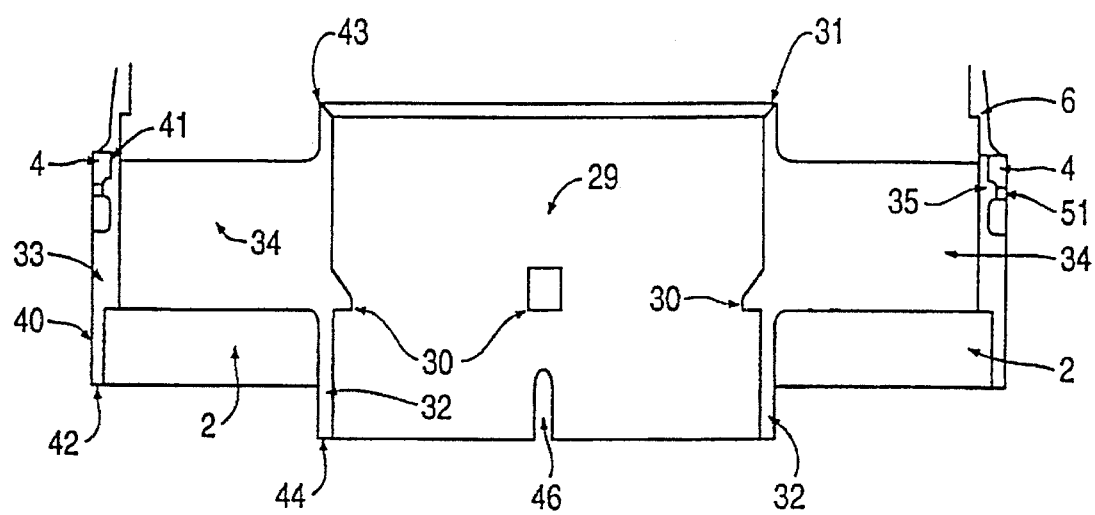
FIG. 3 is a side sectional view of the cylindrical base assembly of the present invention.

In the orientation shown in FIG. 2, air enters the air precleaner 1 through the upwardly angled air inlet vanes 34.

Each upwardly angled inlet vane 34 is positioned at an offset angle relative to the longitudinal center axis C—C, FIG. 1, of the air outlet passageway 29 and air precleaner 1 which is encircled by the air inlet passageway 2. The leading edges 47 of the upwardly angled air inlet vanes 34 are curved downward, reducing the airflow angle of incidence and thus reducing the airflow drag. Each upwardly angled air inlet vane 34 has numerous directional strakes 61 attached to its windwards, e.g. bottom, side 50 starting at the leading edge 49 of the directional strake 61 on the leading edge 47 of the upwardly angled air inlet vane 34 and extending upwardly to the trailing edge 48 of the upwardly angled air inlet vane 34. These directional strakes 61, along with the offset upwardly angled air inlet vanes 34, contribute to directing the airflow as it passes over the upwardly angled air inlet vanes 34. This airflow management is crucial to the operating efficiency of the air precleaner 1.

In the orientation shown in FIG. 1, air and debris must be moved to the inside of the circular toroidal dome separator chamber 5 and out the debris ejection duct 25 to be removed from the airflow vortex. Centrifugal force and airflow management are the principal forces to perform this task.

Figure 5:
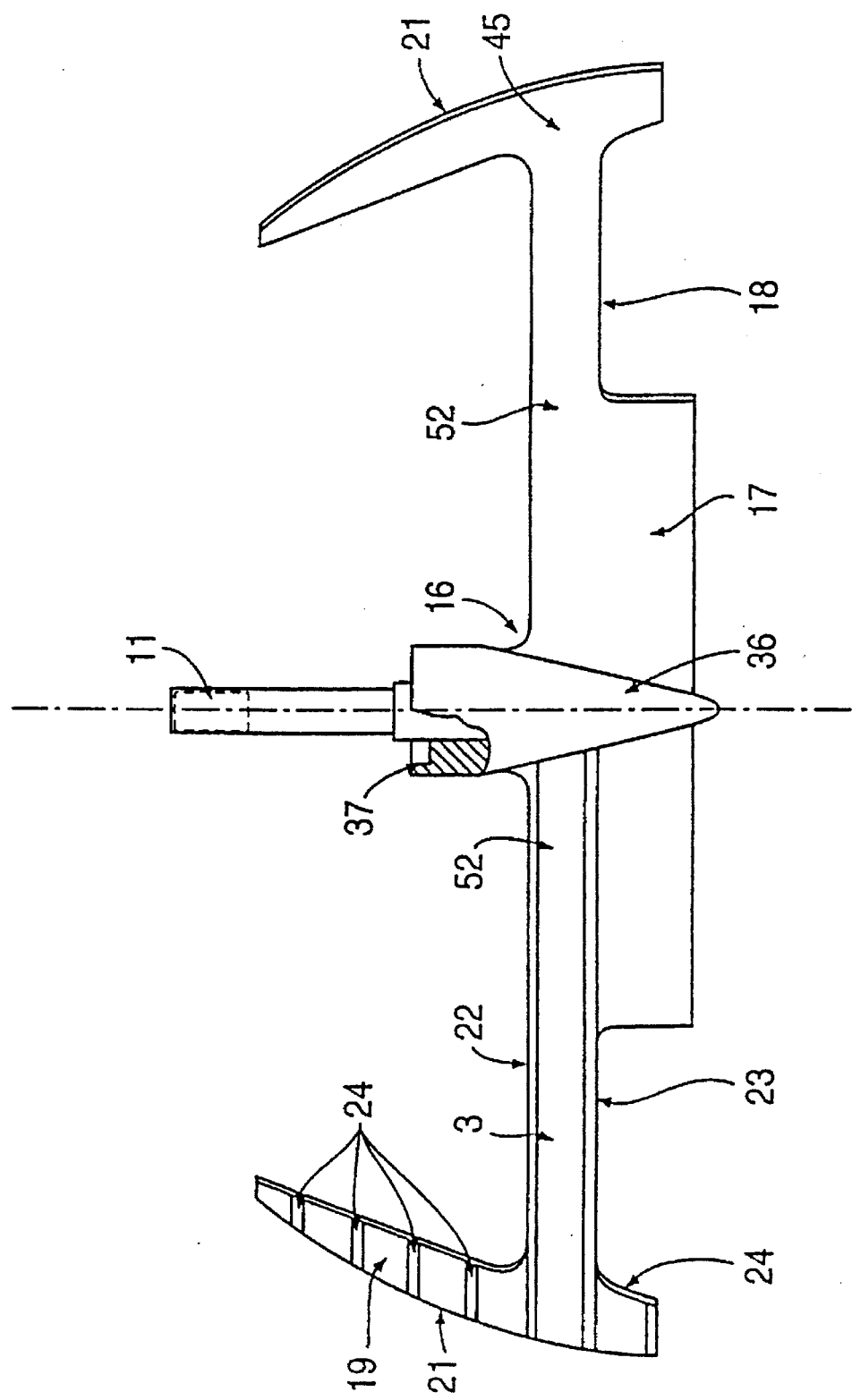
FIG. 5 is a side view of the particle accelerator assembly of the present invention with a portion cut away to expose the male labyrinth seal lip.
Figure 6:
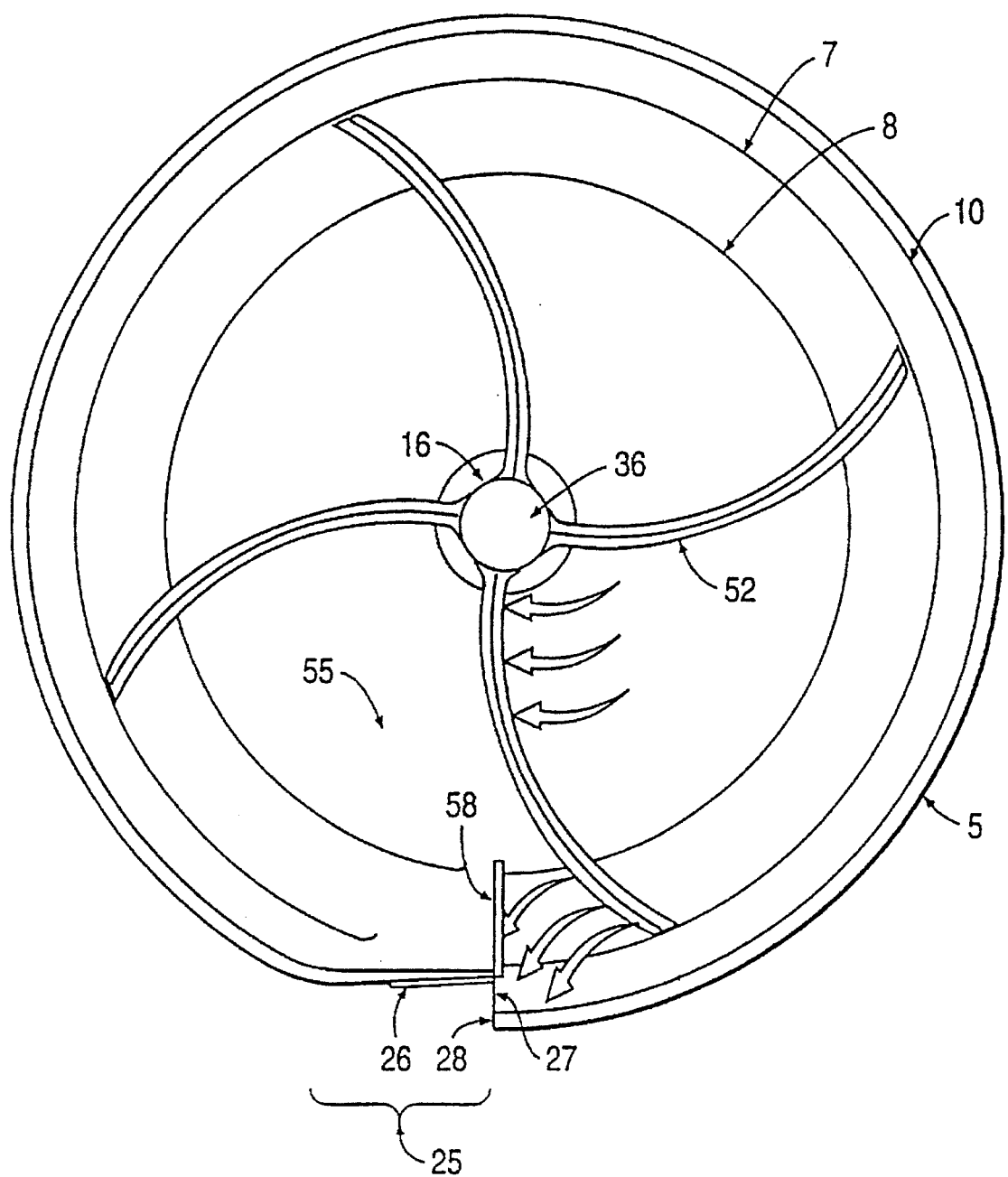
FIG. 6 is a bottom view of the circular toroidal dome separator chamber of the present invention.
Figure 7:
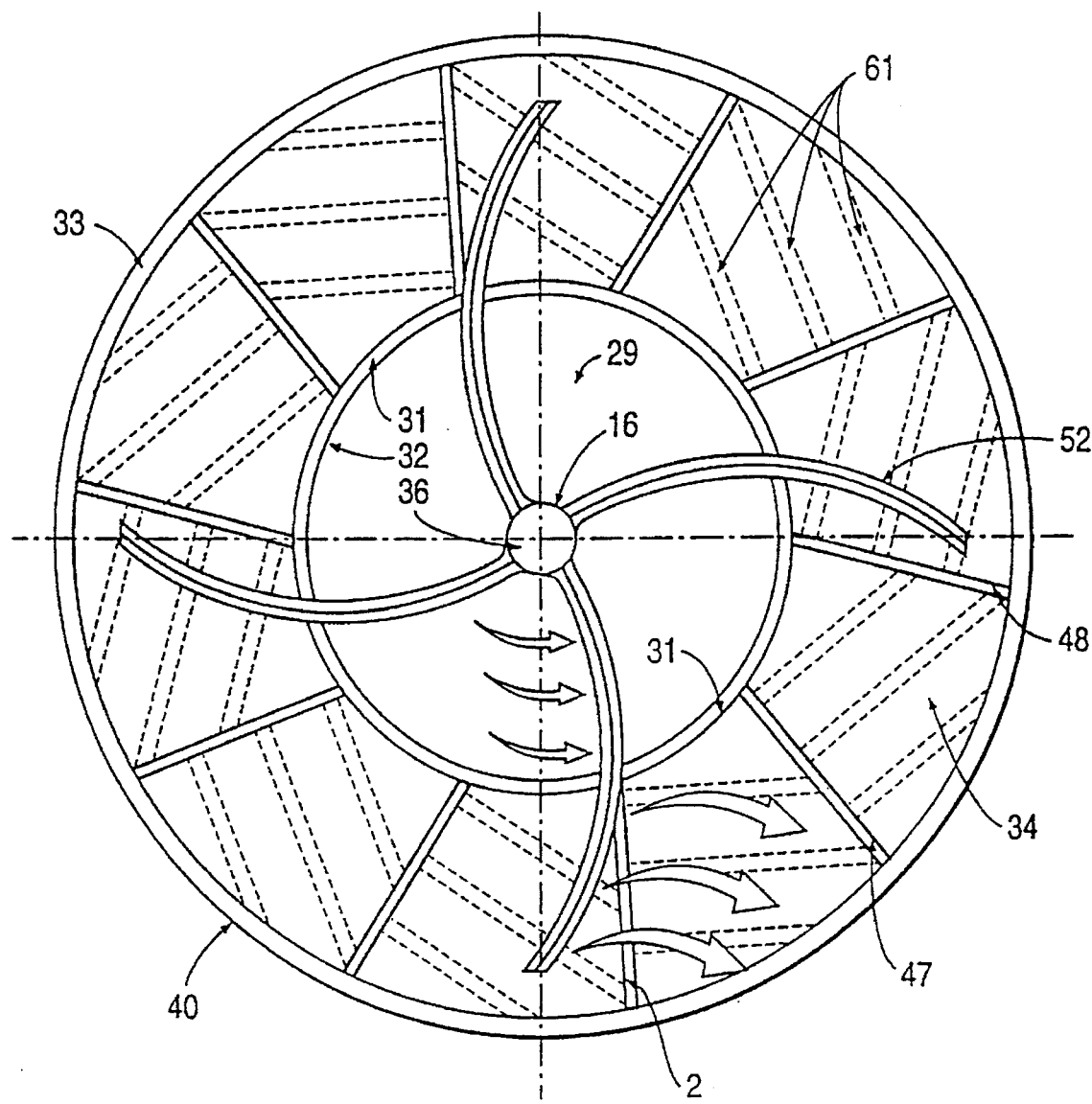
FIG. 7 is a top view of the particle accelerator assembly and the cylindrical base assembly of the present invention.
Figure 8:
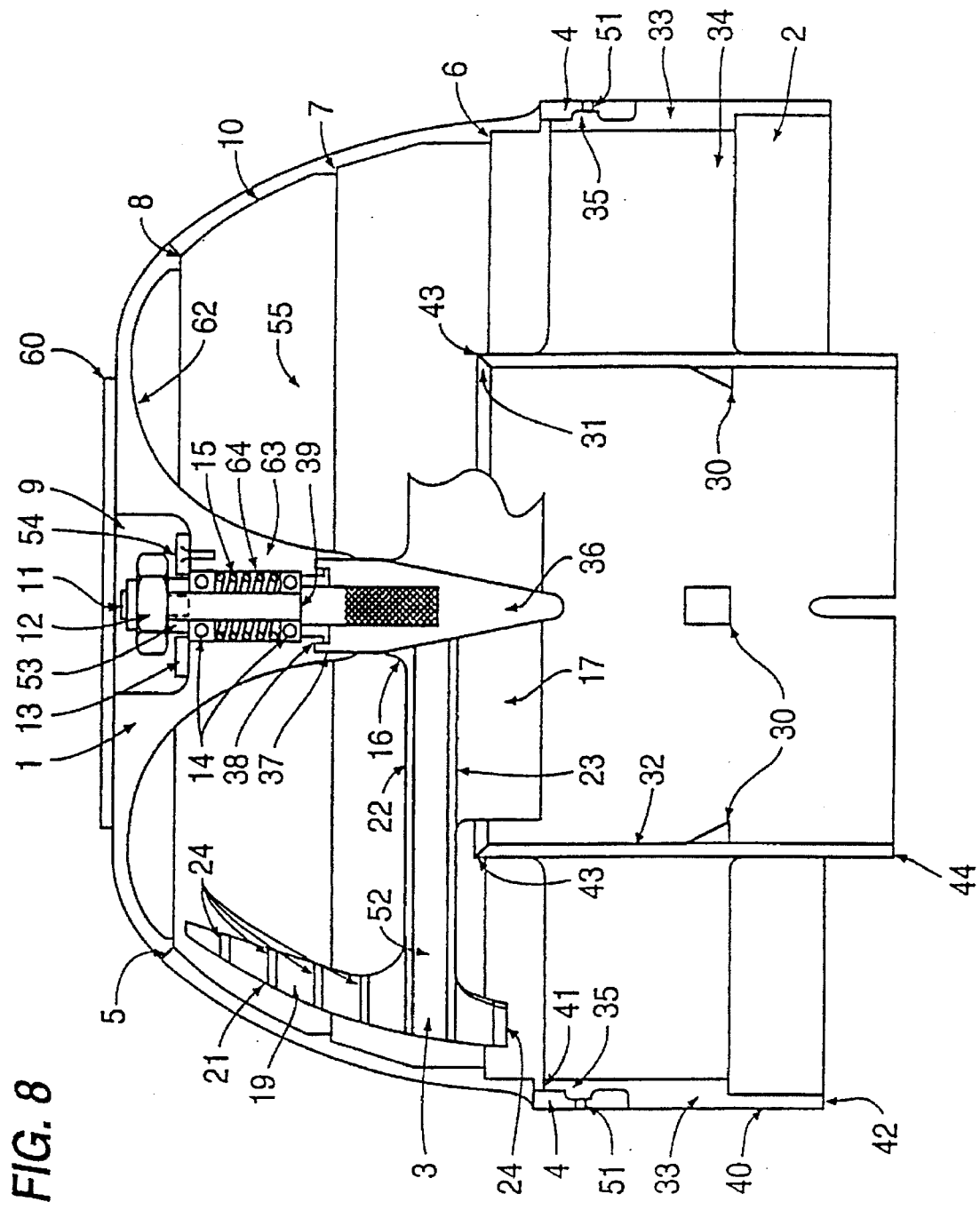
FIG. 8 is a side sectional view of the air precleaner of the present invention with a portion of the particle accelerator assembly cut away.
Figure 9A:
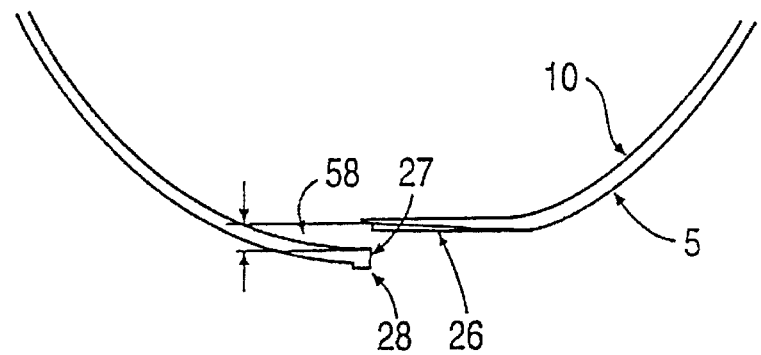
FIGS. 9A and 9B are two vertical sections of the circular toroidal dome separator chamber of the present invention taken along lines A—A and B—B in FIG. 10, respectively.
Figure 9B:
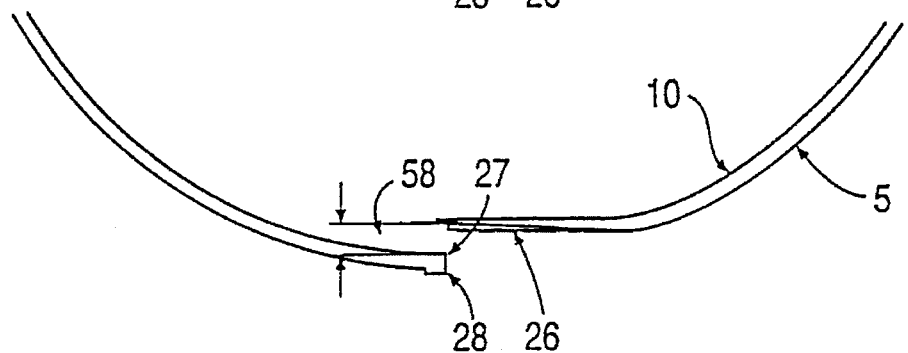
Figure 10:
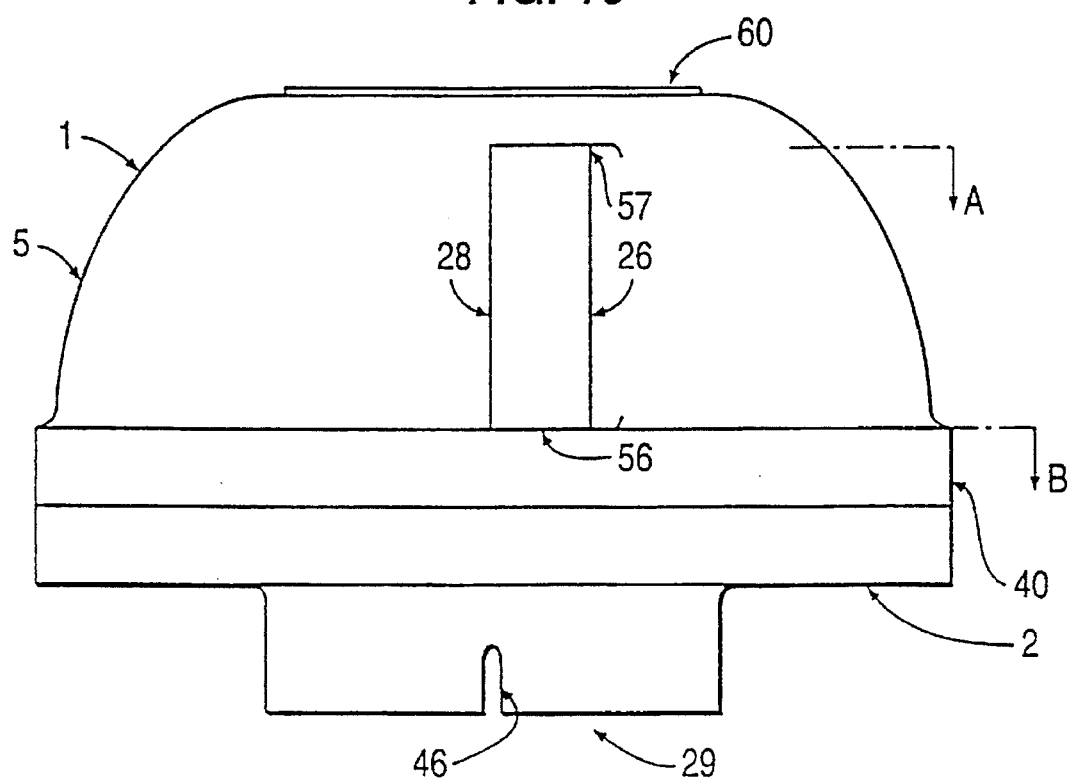
FIG. 10 is a side view of the air precleaner of the present invention.
Figure 11:
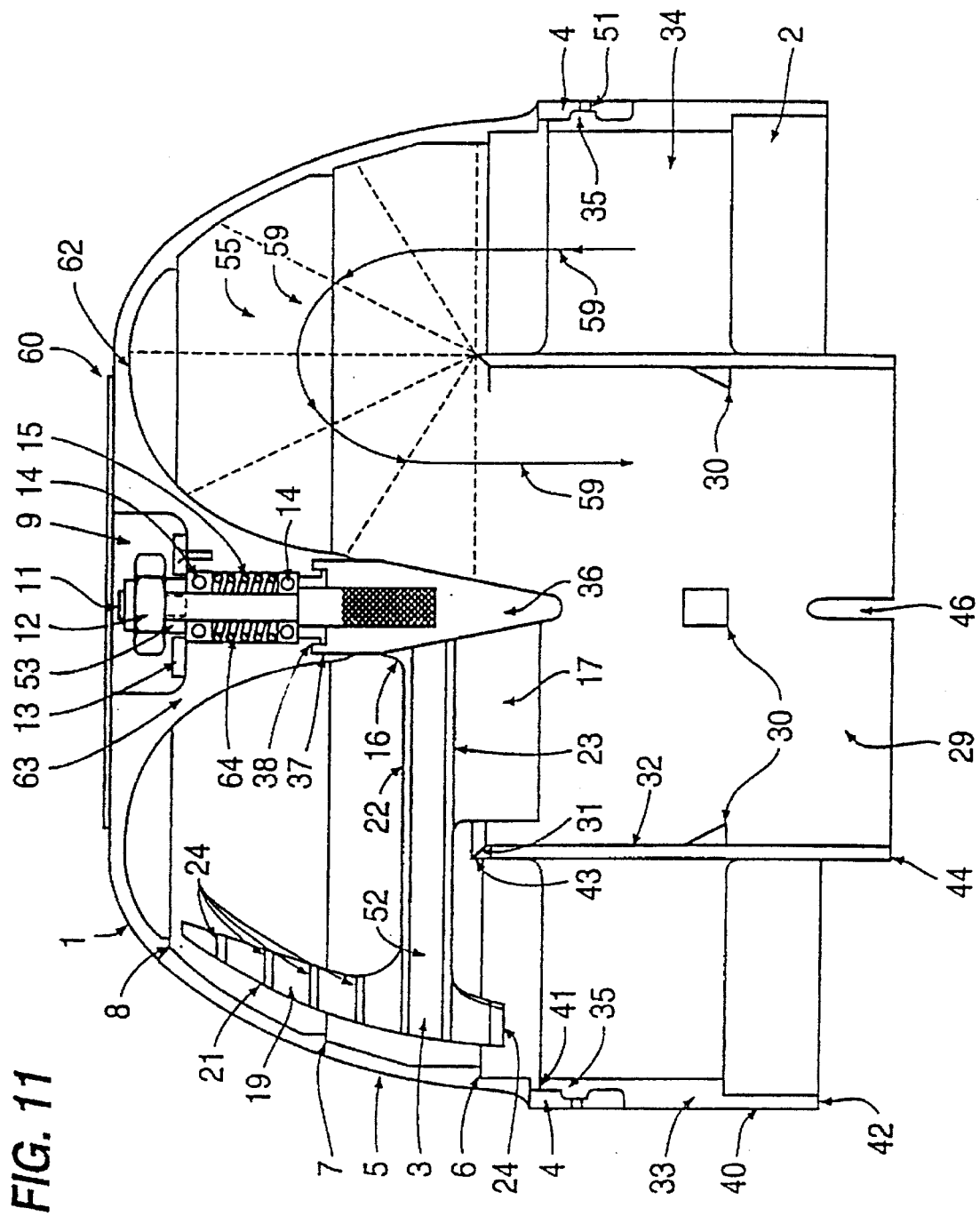
FIG. 11 is a side sectional view of the air precleaner of the present invention with a portion of the particle accelerator assembly cut away to show the cross section area of the precleaner.

In the orientation shown in FIGS. 6 and 7, as the airflow leaves each upwardly angled air inlet vane 34 in a vortex flow pattern and comes in contact with the particle accelerator assembly 16, the velocity of the air and debris is increased and vented outwards towards the inside of the circular toroidal dome separator chamber 5. In the orientation shown in FIGS. 1, 4, 5, 6 and 7 the appendages of the particle accelerator assembly 16 are curved at an arc extending from the central hub 36, resulting in a swept-back attitude relative to the direction of the vortex airflow coming off the upwardly angled air inlet vanes 34, reducing airflow turbulence and causing increased airflow rotational velocity and thus centrifugal acceleration of debris along the curved appendages leading edge 3 and vertical appendage 19, producing an outward velocity vector to the airflow and debris, encouraging ejection from the circular toroidal dome separator chamber 5 through the debris ejection duct 25. The trailing edge of the particle accelerator appendage 18, the trailing edge of the vertical appendage 45, and the trailing bottom of the vertical appendage 20 are streamlined to minimize airflow turbulence. The curved area of the appendages 17 that extends downward into the air outlet passageway 29 is cupped into the direction of the airflow vortex as the airflow vortex changes direction and flows down into the air outlet passageway 29. The curved area of the appendages 17 interfaces with the vortex airflow going into the air outlet passageway 29, maximizing the energy transfer from the airflow vortex to the particle accelerator assembly 16, thus maximizing the appendages' rotational velocity.

Figure 4:
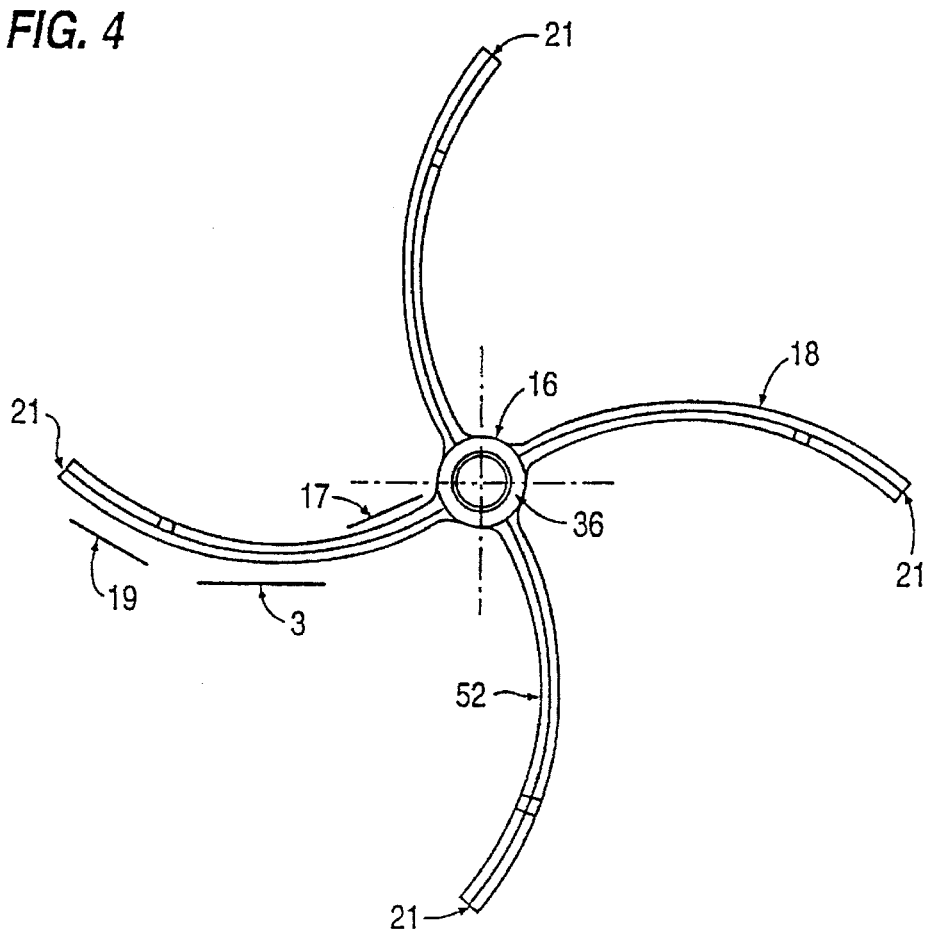
FIG. 4 is a top view of the particle accelerator assembly of the present invention.

In the orientation shown in FIGS. 4, 6 and 7, the airflow management of this precleaner is clearly shown by controlling the direction of the airflow vortex through the upwardly angled air inlet vanes 34 over the directional strakes 61, into fluid communion with the particle accelerator assembly 16, continuing through the circular toroidal dome separator chamber 5, allowing a portion of the airflow and the debris to exit the air precleaner 1 through the debris ejection duct 25 with minimal turbulence while the clean airflow vortex changes direction 180 degrees and increases velocity going through the air outlet passageway 29, powering the particle accelerator assembly 16 with minimal energy loss due to the curved area of the appendages 17. The particle accelerator assembly 16 maximizes the complete use of the swept-back appendages 52 by balancing the transfer of energy absorbed by the curved area of the appendages 17 that form a cupped shape when operating in the air outlet passageway 29 and transferring that energy to the incoming airflow vortex through the curved appendage's leading edge 3 and vertical appendage 19. The particle accelerator assembly 16 has many functional components that all work together in one fluid motion without creating airflow turbulence.

In the orientation shown in FIGS. 6 and 7, the airflow vortex enters the circular toroidal dome separator chamber 5, flowing in an outward directional circular pattern. The swept-back appendages 52 of the particle accelerator assembly 16 contact the airflow vortex at the same angle it leaves the upwardly angled air inlet vanes 34 and therefore are in fluid communion with the airflow vortex leaving the upwardly angled air inlet vanes 34. The swept-back appendages 52 are moving through the incoming airflow vector many times faster than the incoming airflow vector producing an outward velocity vector that greatly increases the centrifugal force while directing the airflow vector outward to the inner wall 10 of the circular toroidal dome separator chamber 5 and out the debris ejection duct 25.

Figure 1A:
FIG. 1A is a sectional view through an appendage of the particle accelerator assembly in FIG. 1 taken along the line I—I.

In the orientation shown in FIGS. 1 and 5, the particle accelerator assembly 16 has one top strake 22 and one bottom strake 23 mounted on the top and bottom on the curved appendage's leading edge 3 of each swept-back appendage 52 along the entire length of the swept-back appendage 52. FIG. 1A shows these strakes and an appendage in cross section. These top and bottom strakes 22 and 23 offer structural reinforcement and form entrapments for airborne debris, directing the debris down the length of the swept-back appendage 52 and depositing the debris in the airflow vortex circulating around the inner wall 10 of the circular toroidal dome separator chamber 5. Additional vertical appendage strakes 24 are attached to the windward surface of the vertical appendage 19, forming several outward directional guides that entrap and direct debris into the debris ejection duct 25. The leading edge 21 of the vertical appendage 19 is contoured to match the inward slope of the circular toroidal dome separator chamber 5 and align with an equal distance along the entire leading edge 21 of the vertical appendage 19 to the debris ejection duct 25.

In the orientation shown in FIGS. 1 and 5, the particle accelerator assembly 16 has multiple swept-back appendages 52 mounted on a central hub 36 that is rotatably attached to the circular toroidal dome separator chamber 5 by a permanently affixed center shaft 11. This affixed center shaft 11 extends upwardly into the center of the bearing assembly 14. The affixed center shaft 11 is attached to the bearing assembly 14 with a lock nut 12, tightened to result in the proper bearing preload. The affixed center shaft 11 is machined down to form a step 39 that mates to the inner race of the lower bearing 14, allowing the affixed center shaft 11 to extend through the bearing assembly 14 and be secured by the top bearing inner race spacer 53 and lock nut 12 in the upper shaft cavity 9. The central hub 36 forms a smooth transition from the downward arch of the circular toroidal dome separator chamber 5 to the bottom of the central hub 36, ending as a round-tipped cone centered over the air outlet passageway 29. This allows for a smooth airflow transition around the central hub 36 into the air outlet passageway 29. A labyrinth seal to prevent air and debris from entering the bearing cavity 64 is formed by male labyrinth seal lip 37 and female labyrinth seal lip 38.

In the orientation shown in FIGS. 1, 6, 8, 9 and 10, the airflow vortex exits the air inlet passageway 2 and enters the lower section of the circular toroidal dome separator chamber 5, moving through the particle accelerator assembly 16. The inner wall 10 of the circular toroidal dome separator chamber 5 is configured with three circumferential strakes 6, 7 and 8. One strake 6 is located at the bottom, one strake 7 is located in the middle, and one strake 8 is located near the top of the circular toroidal dome separator chamber 5. These circumferential strakes 6, 7 and 8 trap debris and direct it to the debris ejection duct 25 while minimizing any effect on the vortex airflow movement through the circular toroidal dome separator chamber 5. The inner wall 10 of the circular toroidal dome separator chamber 5 slopes inwardly decreasing the open area 55 of the circular toroidal dome separator chamber 5, which causes the vortex airflow to increase velocity. The vortex airflow moves through the circular toroidal dome separator chamber 5 in a cyclonic pattern moving upwardly along the inner wall 10, making several revolutions around before reaching the circular toroidal arch 62, folding over, and whirlpooling down past the bearing cavity support 63, powering the particle accelerator assembly 16, and exiting through the air outlet passageway 29.

In the orientation shown in FIGS. 1, 6, 8 and 11, the circular toroidal dome separator chamber 5 is configured to direct the vortex airflow path through a linear reduction in cross section area 59, which increases the velocity of the vortex airflow in the open area 55 of the circular toroidal dome separator chamber 5. The increase in velocity keeps the debris circulating around the inner wall 10 of the circular toroidal dome separator chamber 5, allowing for several opportunities for the debris to be ejected out of the debris ejection duct 25. The linear reduction in cross section area 59 also minimizes the turbulence and airflow restriction through the decreasing open area 55 of the circular toroidal dome separator chamber 5.

In the orientation shown in FIGS. 1, 5, 8 and 11, the bearing cavity 64 is formed in the bearing cavity support 63 centered in the downward slope of the circular toroidal separator chamber 5 centered over the air outlet passageway 29. The bearing assembly 14 is made of one lower bearing seated in the bearing cavity 64 to affix the outer race and align the affixed center shaft 11 and one spacer spring 15 to keep the bearing properly spaced but not allowing the bearing assembly 14 to be overloaded, e.g. spacer spring 15 can be compressed by upward movement of the particle accelerator assembly 16 and shaft 11 in the bearing cavity 64 when the air precleaner is subjected to jarring or impact loading in a direction along the longitudinal axis C—C, the spring absorbing some of the shock and preventing the bearing assembly from being overloaded. Thus, this mounting arrangement acts as a shock absorber for rotatably mounting the particle accelerator assembly 16. The bearing assembly 14 is seated in the top of the bearing cavity 64 by a bearing retainer ring 13 which is held in place by the bearing retainer screws 54 and a top bearing inner race spacer 53, goes onto the affixed center shaft 11, and is held in place by a lock nut 12. An upper shaft cavity 9 holds the threaded portion of the affixed centered shaft 11, bearing retainer ring 13 and bearing retainer screws 54, top bearing inner race spacer 53, and lock nut 12. The upper shaft cavity 9 is sealed with a top shaft cavity seal 60.

In the orientation shown in FIGS. 1, 6, 9 and 10, the debris ejection duct 25 is formed into the vertical side of the circular toroidal dome separator chamber 5 at the bottom 56 and extends vertically to top 57. The debris ejection duct opening 27 is larger at the bottom 56 and decreases in open area to its smallest point at the top 57. The leading edge 26 of the debris ejection duct 25 extends into the outermost area of the airflow vortex 58 while the circular toroidal dome separator chamber outer housing edge ends at 28, along the entire length of the debris ejection duct opening 27. The debris ejection duct 25 is configured to eject debris and a minimal amount of vortex air from the circular toroidal dome separator chamber 5. The debris ejection duct opening 27 is positioned near normal to the vortex airflow allowing for several opportunities for debris to be ejected while the vortex airflow passes over the ejection outlet duct multiple times.

In the orientation shown in FIGS. 1, 2, 3, 7, 8 and 11, the airflow vortex has reached its maximum velocity as it flows over the leading edge chamfer 31, powers the particle accelerator assembly 16, flows through the air outlet passageway 29, and exits the air precleaner 1.

Figure 12:
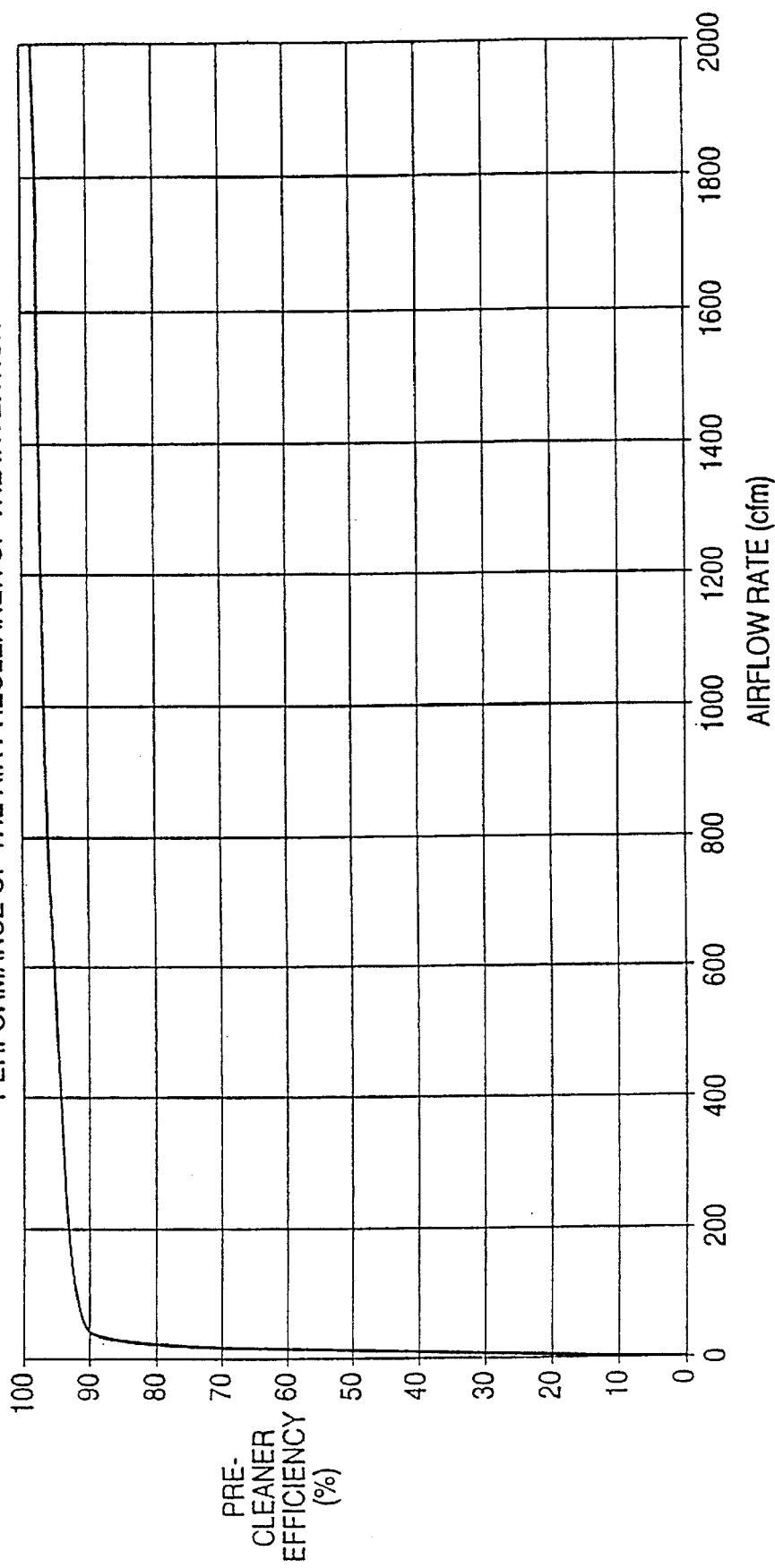
FIG. 12 is graph illustrating the high level of performance of the air precleaner of the invention over the broad range of airflow rates through the air precleaner to an internal combustion engine expressed as a function of percentage of particles of a certain size removed from the incoming air by the air precleaner.

The above described precleaner of the present invention offers a means of precleaning air that makes maximum use of centrifugal force while minimizing airflow restriction. The airflow management of this precleaner 1 is clearly shown by the above described invention to allow for maximum debris separation out of the vortex airflow while maintaining a fluid communion between the air and the precleaner. A further benefit derived from the airflow management of this air precleaner 1 is its ability to operate over a broad airflow range, producing a very flat performance curve resulting in high debris efficiency removal rates throughout the entire airflow range. FIG. 12 illustrates the results of tests of an embodiment of the invention which demonstrate a very high rate of particulate removal over a broad airflow range of the air precleaner used in connection with an internal combustion engine. Precleaner efficiency as plotted in FIG. 12 was determined by calculating the percentage of dust and debris exiting the precleaner's debris ejection duct based on the total mass of dust and debris injected into the precleaner.

All references to "TOP" or "BOTTOM" and corresponding identifying labels to the air precleaner 1 have been used herein for illustrative purposes in as much as the air precleaner 1 can be mounted and function in any position. The air precleaner in the disclosed embodiment is made of molded plastic components except for the center shaft of the particle accelerator assembly and the bearings and spring rotatably supporting the assembly, which are made of metal. However, the invention is not confined to the particular construction and specific arrangement of parts herein illustrated and described, but embraces such modified forms thereof as come within the scope of the following claims.

I claim:

1. An air precleaner for centrifugally ejecting heavier-than-air particulate debris from an air stream drawn through the air precleaner for use in an apparatus having an air intake, said air precleaner comprising: a base, a circular separator chamber connected to said base and including an inner wall with a debris ejection duct therein; and a particle accelerator assembly rotatably mounted in said separator chamber; said base having an inlet for the passage of debris laden air into said air precleaner, a plurality of air inlet vanes angled upwardly with respect to a longitudinal axis of said air precleaner for directing incoming debris laden air into said circular separator chamber as a vortex airflow and an outlet for the passage of air from said air precleaner after the air has moved through said circular separator chamber for centrifugally removing heavier-than-air particulate debris therefrom by way of said debris ejection duct; and said circular separator chamber being formed with a toroidal dome for smooth airflow transition of the vortex airflow moving through said separator chamber in a cyclonic pattern upwardly from said inlet past said debris ejection duct where it is folded over by said toroidal dome for whirlpooling down to said outlet radially inwardly of and through said upwardly moving vortex airflow, said particle accelerator assembly including a central hub having an outer configuration which forms a smooth transition from a downward arch of said toroidal dome to the bottom of said central hub.

2. The air precleaner according to claim 1, wherein said downward arch of said toroidal dome is formed by a circular toroidal arch at an upper end of said separator chamber.

3. The air precleaner according to claim 2, wherein said inner wall of said separator chamber, as seen in a cross section thereof taken along said longitudinal axis of said air precleaner slopes inwardly in the direction of said toroidal dome to decrease the cross sectional area for said vortex airflow moving through said separator chamber.

4. The air precleaner according to claim 3, wherein the shape of said separator chamber provides a linear reduction in cross sectional area of the flow path for said vortex airflow moving through said separator chamber thereby increasing the velocity of the vortex airflow in the separator chamber and keeping debris in the air circulating around said inner wall of the separator chamber for ejection through said debris ejection duct.

5. The air precleaner according to claim 1, wherein said debris ejection duct extends upwardly along an inner wall of said separator chamber between said air inlet and said toroidal dome.

6. The air precleaner according to claim 5, wherein the open area of said debris ejection duct is larger at a lower end of said duct than at an upper end thereof and decreases from said lower end to said upper end.

7. The air precleaner according to claim 1, wherein said particle accelerator assembly further includes a plurality of curved appendages that arc back from said central hub in a swept-back attitude relative to the direction of the vortex airflow coming off said upwardly angled air inlet vanes thereby imparting an outward velocity vector to the air and debris.

8. The air precleaner according to claim 7, wherein a curved area of the appendages extends downward into a passageway of said air outlet of said base, said curved area being cupped in the direction of the airflow vortex in said air outlet passage for rotationally powering said particle accelerator assembly at a speed greater than the rotational speed of said upwardly moving vortex airflow.

9. An air precleaner for centrifugally ejecting heavier-than-air particulate debris from an air stream drawn through the air precleaner for use in an apparatus having an air intake, said air precleaner comprising:

a base, a circular separator chamber connected to said base and including an inner wall with a debris ejection duct therein; and a particle accelerator assembly rotatably mounted in said separator chamber; said base having an inlet for the passage of debris laden air into said air precleaner, a plurality of air inlet vanes angled upwardly with respect to a longitudinal axis of said air precleaner for directing incoming debris laden air into said circular separator chamber as a vortex airflow and an outlet for the passage of air from said air precleaner after the air has moved through said circular separator chamber for centrifugally removing heavier-than-air particulate debris therefrom by way of said debris ejection duct; and said circular separator chamber being formed with a toroidal dome for smooth airflow transition of the vortex airflow moving through said separator chamber in a cyclonic pattern upwardly from said inlet past said debris ejection duct where it is folded over by said toroidal dome for whirlpooling down to said outlet radially inwardly of and through said upwardly moving vortex airflow, wherein said debris ejection duct extends upwardly in an inner wall of said circular separator chamber, a plurality of circumferential strakes being provided on said inner wall of said separator chamber for trapping debris moving in said vortex airflow and directing the debris to the debris ejection duct.

10. An air precleaner for centrifugally ejecting heavier-than-air particulate debris from an air stream drawn through the air precleaner for use in an apparatus having an air intake, said air precleaner comprising:

a base, a circular separator chamber connected to said base and including an inner wall with a debris ejection duct therein; and a particle accelerator assembly rotatably mounted in said separator chamber; said base having an inlet for the passage of debris laden air into said air precleaner, a plurality of air inlet vanes angled upwardly with respect to a longitudinal axis of said air precleaner for directing incoming debris laden air into said circular separator chamber as a vortex airflow and an outlet for the passage of air from said air precleaner after the air has moved through said circular separator chamber for centrifugally removing heavier-than-air particulate debris therefrom by way of said debris ejection duct; and said circular separator chamber being formed with a toroidal dome for smooth airflow transition of the vortex airflow moving through said separator chamber in a cyclonic pattern upwardly from said inlet past said debris ejection duct where it is folded over by said toroidal dome for whirlpooling down to said outlet radially inwardly of and through said upwardly moving vortex airflow, wherein said particle accelerator assembly includes a central hub and a center shaft connected to said central hub, said particle accelerator assembly being rotatably mounted in said separator chamber by way of said center shaft which is rotatably supported by a bearing assembly, in an upper end of said separator chamber, said central hub having an outer configuration which forms a smooth transition from a downward arch of said circular toroidal dome of said separator chamber to the bottom of said central hub, which ends as a rounded tipped cone centered over said air outlet in said base.

11. The air precleaner according to claim 10, wherein a labyrinth seal is provided between adjacent ends of said central hub of said particle accelerator assembly and said downward arch of said circular toroidal dome of said separator chamber in the vicinity of said smooth transition from said downward arch to said central hub.

12. An air precleaner for centrifugally ejecting heavier-than-air particulate debris from an air stream drawn through the air precleaner for use in an apparatus having an air intake, said air precleaner comprising:

a base, a circular separator chamber connected to said base and including an inner wall with a debris ejection duct therein; and a particle accelerator assembly rotatably mounted in said separator chamber; said base having an inlet for the passage of debris laden air into said air precleaner, a plurality of air inlet vanes angled upwardly with respect to a longitudinal axis of said air precleaner for directing incoming debris laden air into said circular separator chamber as a vortex airflow and an outlet for the passage of air from said air precleaner after the air has moved through said circular separator chamber for centrifugally removing heavier-than-air particulate debris therefrom by way of said debris ejection duct; and said circular separator chamber being formed with a toroidal dome for smooth airflow transition of the vortex airflow moving through said separator chamber in a cyclonic pattern upwardly from said inlet past said debris ejection duct where it is folded over by said toroidal dome for whirlpooling down to said outlet radially inwardly of and through said upwardly moving vortex airflow, wherein said particle accelerator assembly includes a central hub and a plurality of appendages curved as an arc extending from said central hub in a swept-back attitude relative to the direction of said vortex airflow coming off said upwardly angled air inlet vanes, said appendages each having strakes formed into the top and bottom of a leading edge thereof for entrapment of airborne debris, directing the debris down the length of the appendage and depositing the debris in the airflow vortex circulating around said inner wall of said circular toroidal dome separator chamber.

13. The air precleaner according to claim 12, wherein the radially outer ends of said appendages extend vertically and are contoured to match an inward slope of said circular toroidal dome separator chamber with an equal distance along the entire leading edge of said vertically extending outer ends of said appendages to the debris ejection duct, said vertically extending appendages being wider at their bottom end and narrowing in the direction of their top end.

14. The air precleaner according to claim 13, wherein said vertically extending outer ends of said appendages each have a plurality of outwardly directed strakes formed thereon for entrapping and directing debris into said debris ejection duct.

15. The air precleaner according to claim 1, where each of said air inlet vanes is provided with directional strakes in its bottom side for directing the debris laden air as it passes over said air inlet vanes.

16. An air precleaner for centrifugally ejecting heavier-than-air particulate debris from an air stream drawn through the air precleaner for use in an apparatus having an air intake, said air precleaner comprising: a base; a circular separator chamber connected to said base and including an inner wall with a debris ejection duct therein; and a particle accelerator assembly rotatably mounted in said separator chamber; said base having an inlet for the passage of debris laden air into said air precleaner, a plurality of air inlet vanes angled upwardly with respect to a longitudinal axis of said air precleaner for directing incoming debris laden air into said circular separator chamber as a vortex airflow, said inlet vanes being arranged in non-overlapping relation with respect to each other as seen in a direction along said longitudinal axis of said air precleaner and said inlet vanes being offset relative to said longitudinal axis, and an outlet for the passage of air from said air precleaner after the air has moved through said circular separator chamber for centrifugally removing heavier-than-air particulate debris therefrom by way of said debris ejection duct, and said particle accelerator assembly including a central hub and a plurality of curved appendages that arc back from said central hub in a swept-back attitude relative to the direction of the vortex airflow coming off said upwardly angled air inlet vanes.

17. An apparatus for centrifugally ejecting heavier-than-air particulate debris from an air stream drawn into the apparatus, said apparatus comprising: means forming a circular separator chamber having an inner wall with a debris ejection duct therein; a particle accelerator assembly rotatably mounted in said separator chamber for rotation about a longitudinal axis of said apparatus; an inlet for the passage of debris laden air into said circular separator chamber; a plurality of air inlet vanes angled upwardly with respect to said longitudinal axis of said apparatus for directing incoming debris laden air into said circular separator chamber as a vortex airflow; an outlet for the passage of air from said separator chamber after the air has moved through said circular separator chamber for centrifugally removing heavier-than-air particulate debris therefrom by way of said debris ejection duct; said circular separator chamber being formed with a toroidal dome for smooth airflow transition of the vortex airflow moving through said separator chamber in a cyclonic pattern upwardly from said inlet past said debris ejection duct where it is folded over by said toroidal dome for whirlpooling down to said outlet radially inwardly of and through said upwardly moving vortex airflow; and wherein said inner wall of said separator chamber, as seen in a cross-section thereof taken along said longitudinal axis slopes inwardly in the direction of said toroidal dome over most of the axial extent of said inner wall to progressively decrease the cross-sectional area for said vortex airflow moving through said separator chamber.

18. An apparatus according to claim 17, wherein said debris ejection duct extends upwardly along said inner wall of said separator chamber between said air inlet and said toriodal dome.

19. The apparatus according to claim 18, wherein at least one circumferential strake is provided on said inner wall of said separator chamber for trapping debris moving in said vortex airflow and directing the debris to said debris ejection duct.

20. The apparatus according to claim 17, wherein a leading edge of said debris ejection duct extends into the outer most area of the airflow vortex.

21. The apparatus according to claim 17, further comprising a shock absorber mounting arrangement for rotatably mounting said particle accelerator assembly for rotation in said separator chamber.

* * * * *